Sept. 18, 1928.
W. LAPINOJA
1,684,631
BRUSH
Filed Nov. 19, 1927
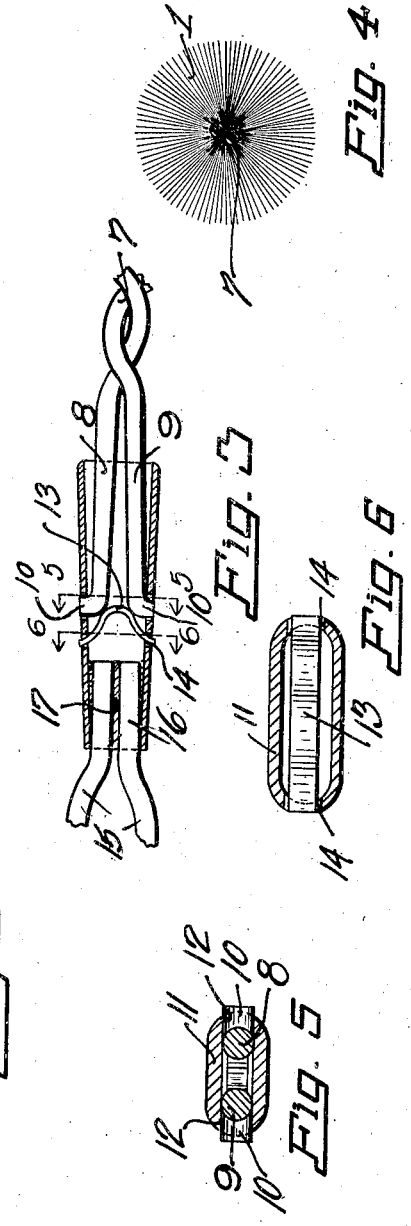
Inventor
William Lapinoja
By Herbert E Smith
Attorney Patented Sept. 18, 1928.

1,684,631

UNITED STATES PATENT OFFICE.

WILLIAM LAPINOJA, OF ENUMCLAW, WASHINGTON.

BRUSH.

Application filed November 19, 1927. Serial No. 234,305.

My present invention relates to an improved brush which while adapted for various purposes, is particularly designed for cleansing the interior of tubes of milking machines. As is well known, the milking tubes are of a general funnel shape, that is, they comprise at least two parts of differing diameters. The device of my invention is designed for the purpose of cleansing tubes of this character and is therefore fashioned and shaped to adapt it for this type of tubes. Under existing conditions, two brushes are required for cleansing the tubes, but by the use of the brush of my invention, a single brush performs the functions of the two brushes.

The invention consists in certain novel combinations and arrangements of parts between the brush and the brush handle whereby these parts may be separated in order that the brush may be cleansed, or for the purpose of substituting or interchanging one brush for another when required.

The invention consists in certain novel combinations and arrangements of parts as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 1 is a view in side elevation of a brush embodying my invention;

Fig. 2 is a similar view but showing the brush inserted within a milking tube;

Fig. 3 is an enlarged detail sectional view showing the joint between the detachable handle and the brush;

Fig. 4 is a sectional view at line 4—4 of Fig. 1;

Fig. 5 is a sectional view at line 5—5 of Fig. 3; and

Fig. 6 is a sectional view at line 6—6 of Fig. 3.

In carrying out my invention, the brush is fashioned with a main large rounded member 1 which at 2 tapers down to the reduced or pointed member 3, and this specially formed brush is designed to be inserted and rotated within the tube of the milking machine shown in Fig. 2 which has a large cylindrical part 4, a conical portion 5 and a reduced cylindrical portion 6. The corresponding parts of the brush of course fit into these tubular members, and the brush may be reciprocated longitudinally in the tube and rotated therein for the purpose of cleansing the interior of the tube. The bristles of the brush are secured in usual or suitable manner to the twisted stem 7 that extends throughout the length in the interior of the brush, and the two shanks 8 and 9 at the end of this twisted stem are provided with angular heads 10 that project at right angles from the shanks 8 and 9. The twisted stem is made up of wire and the shanks 8 and 9 possess a resiliency and are of sufficient length to permit them being squeezed together or extended as indicated in Fig. 3 and due to this resiliency of these shanks the brush is detachably secured to the ferrule 11 of the handle of the brush. This ferrule preferably is flattened as indicated in Figs. 5 and 6 and is provided with side slots 12 in its walls to accommodate the heads 10 of the shanks 8 and 9. It will be apparent that the shanks 8 and 9 may be squeezed together and inserted in the open end of the ferrule and then when the shanks are released the heads, due to resiliency of the shanks, are projected through the slots 12 to lock the handle to the brush. To guide the heads into their slots, I provide a spreader 13 which comprises a metal plate of somewhat U shape which is located transversely of the ferrule and has its ends fixed in opposite slots 14 in the wall of the ferrule. This spreader 13 forms an abutment against which the shanks 8 are pushed and the rounded end of the spreader causes the heads 10 to slip into the slots 12 to lock the shanks.

The handle 15 is in the form of a loop made out of wire similar to the stem of the brush, and the ends 16 of this loop are welded or otherwise secured at 17 in the smaller end of the tapering ferrule 11, as shown in Fig. 3.

The spreader 13 is a resilient member and is designed to perform the functions of a spring that holds the two heads 10 of the shanks 8 and 9 in their slots or sockets 12, and this resilient spreader 13 by preventing inward movement of the free ends of the shanks 8 and 9 locks these heads in their sockets to prevent displacement of the handle from the brush, or of the brush from the handle.

Having thus fully described my invention, what I claim as new and desire to secure by Letters Patent is—

The combination with a brush having a twisted wire stem, resilient shanks on said stem, and laterally projecting heads at the ends of said shanks, of a separable handle having a fixed ferrule with oppositely disposed sockets in its wall to receive said heads, and a transversely extending U-shaped resilient spreader located in the path of said heads having its ends anchored in the ferrule and adapted to project said heads through the walls of the ferrule.

In testimony whereof I affix my signature.

WILLIAM LAPINOJA.